(12) United States Patent
Goh et al.

(10) Patent No.: US 10,176,314 B2
(45) Date of Patent: Jan. 8, 2019

(54) AUTHENTICATION SYSTEM AND METHOD

(71) Applicant: VERTICAL SOFTWARE ASIA PTE LTD, Singapore (SG)

(72) Inventors: Kian Hwa Goh, Singapore (SG); Chun Wei Shaun Tan, Singapore (SG)

(73) Assignee: VERTICAL SOFTWARE ASIA PTE LTD, Singapore (SG)

( * ) Notice: Subject to any disclaimer, the term of this patent is extended or adjusted under 35 U.S.C. 154(b) by 0 days.

(21) Appl. No.: 15/514,185

(22) PCT Filed: Sep. 23, 2015

(86) PCT No.: PCT/SG2015/050334
§ 371 (c)(1),
(2) Date: Mar. 24, 2017

(87) PCT Pub. No.: WO2016/048240
PCT Pub. Date: Mar. 31, 2016

(65) Prior Publication Data
US 2017/0255768 A1    Sep. 7, 2017

(30) Foreign Application Priority Data
Sep. 24, 2014   (SG) .............................. 10201406045P

(51) Int. Cl.
| | |
|---|---|
| *G06F 21/35* | (2013.01) |
| *G06Q 20/32* | (2012.01) |
| *G06Q 20/34* | (2012.01) |
| *H04B 5/00* | (2006.01) |
| *H04W 4/80* | (2018.01) |
| *H04L 9/32* | (2006.01) |

(52) U.S. Cl.
CPC ......... *G06F 21/35* (2013.01); *G06Q 20/3278* (2013.01); *G06Q 20/352* (2013.01); *H04B 5/0031* (2013.01); *H04B 5/0056* (2013.01); *H04L 9/3247* (2013.01); *H04W 4/80* (2018.02)

(58) Field of Classification Search
CPC ........ G06F 21/35; H04W 4/80; H04B 5/0056; H04B 5/0031; G06Q 20/352; G06Q 20/3278
USPC ....................................................... 455/41.1
See application file for complete search history.

(56) References Cited

U.S. PATENT DOCUMENTS

| | | | | |
|---|---|---|---|---|
| 2008/0162361 | A1* | 7/2008 | Sklovsky | G06Q 20/32 705/65 |
| 2013/0056539 | A1 | 3/2013 | Iwaloye | |
| 2013/0200146 | A1* | 8/2013 | Moghadam | G06Q 40/04 235/379 |
| 2014/0020068 | A1* | 1/2014 | Desai | H04L 63/10 726/4 |

(Continued)

FOREIGN PATENT DOCUMENTS

| | | |
|---|---|---|
| JP | 2002-300157 | 10/2002 |
| JP | 2005-231117 | 9/2005 |
| JP | 2010-61580 | 3/2010 |

*Primary Examiner* — Ayodeji O Ayotunde
(74) *Attorney, Agent, or Firm* — Garcia-Zamor IP Law; Ruy M. Garcia-Zamor

(57) ABSTRACT

Described herein is a system for utilizing an embedded NFC chip in a rubber stamp for authenticating and verifying documents through a 2FA process that is connected to a cloud platform comprising a secure element operably connected to the NFC baseband; and a unique authentication id stored in the secured element.

2 Claims, 4 Drawing Sheets

(56) References Cited

U.S. PATENT DOCUMENTS

2016/0042207 A1\* 2/2016 Inotay ................ G06K 7/10257
340/5.8

\* cited by examiner

AUTHENTICATION SYSTEM AND METHOD

TECHNICAL FIELD

The present invention relates generally to the use of NFC combined in a device, for example a Rubber Stamp, a credit card, as a trigger for authentication with a cloud-based platform whereby it will authorize the user to be able to securely sign documents.

BACKGROUND

The usage of NFC has become common place in the market. Rubber stamps for the purpose of authenticating documents in the real world are still a commonplace despite the fact that electronic solutions of document processing and signature exist.

Near Field Communication (NFC) is a technology that uses electromagnetic waves to exchange data. NFC waves are transmitted over a short-range (on the order of a few inches) and at high-frequencies. NFC devices are already being used to make payments at point of sale devices. NFC is an open standard (see, e.g. ISO/IEC 18092) specifying modulation schemes, coding, transfer speeds and RF interface. There has been wider adoption of NFC as a communication platform because it proves better security for financial transactions and access control.

A problem arises in the real world is that no single company is able to introduce a method of document authenticity verification. Which has resulted in companies not being able to be truly paperless because in certain business process, documents still need to be verified with a company chop using a rubber stamp.

Accordingly, the present invention seeks to resolve this problem by redefining the usage of the rubber stamp or the like objects as an authentication device by having an embedded NFC tag in the stamp.

SUMMARY

In accordance with an aspect of the invention, there is disclosed an authentication system for utilizing an embedded NFC chip couplable with an object for authenticating a document, the authentication system comprising a mobile communication system. The mobile communication device comprises a controller executing a mobile application to enable initiation of an authentication process via at least one of detecting proximity of the NFC chip with the mobile communication device and initiation by a user by interaction thereof with the mobile communications device, the authentication process for prompting for a password code from the user and at least one of a user id from the user and an NFC chip id from the NFC chip, the password code and at least one of the NFC chip id and the user id being providable to a cloud platform for authentication thereby. An image is receivable from the cloud platform upon positive authentication of the password code and at least one of the NFC chip id and the user id thereby for one of application to or association with the document stored and processable by one of the mobile communication device and a system in data communication with the mobile communication device.

In accordance with a second aspect of the invention, there is disclosed a system for utilizing an embedded NFC chip in a rubber stamp for authenticating and verifying documents through a 2FA process that is connected to a cloud platform comprising a secure element operably connected to the NFC baseband; and a unique authentication id stored in the secured element.

BRIEF DESCRIPTION OF THE DRAWINGS

For a better understanding of the present disclosure, non-limiting and non-exhaustive embodiments are described in reference to the following drawings. In the drawings, like reference numerals refer to parts through all the various figures unless otherwise specified.

DETAILED DESCRIPTION

Figure 1:
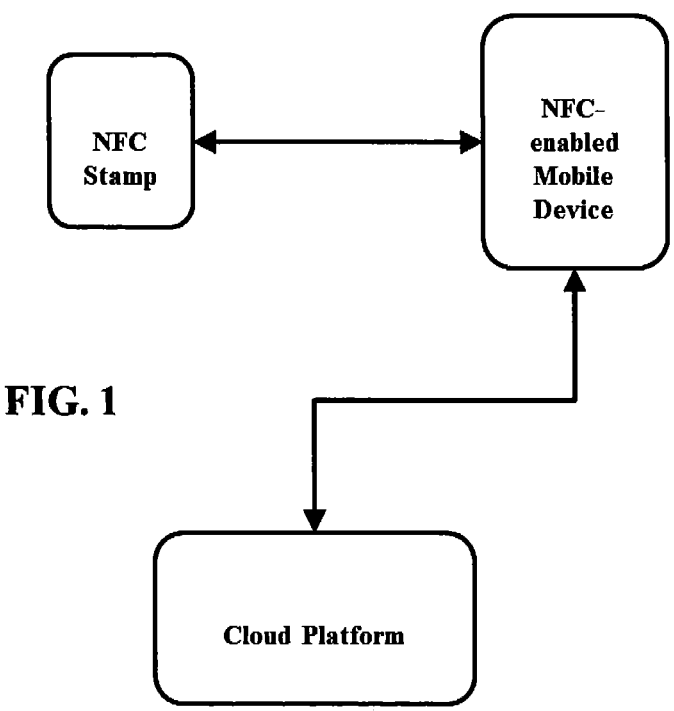
FIG. 1. shows a system diagram of an authentication system utilizing an authentication method executed between the embedded NFC chip in the rubber stamp with the platform in the cloud in accordance to an aspect of the invention.

An exemplary embodiment of the present invention, an authentication method utilising an authentication system, is described hereinafter with reference to FIG. 1, FIG. 2, FIG. 3 and FIG. 4.

Embedded NFC Chip in a Device (for Example a Rubber Stamp)

The present invention provides an authentication method and an authentication system ("a system" and "a method" respectively) that can be utlilized with a variety of different portable communication devices, including but not limited to PDA's cellular phones, smart phones, laptops, tablet computers and other mobile devices that include cellular data service as preferable access to consumer downloadable applications. One such device could be an iPhone or Samsung S5. The portable communication device technology platform may be Apple OS, Android OS, Microsoft Windows mobile, Microsoft Windows Phone 7, RIM Blackberry OS, Samsung Tizen, Symbian, Java or any other technology platform. For the purposes of this disclosure, the present invention has been generally described in accordance with features and interfaces that are optimized for a smart phone utilizing a general platform that is connected to our system in the cloud, although one skilled in the art would understand that all such features and interfaces may also be used and adapted for any other platform and/or device.

A user creates an account with a unique company id on our cloud based platform. After providing authenticity of the legitimacy of the user who is authorized to create such the company id, the admin rights will be assigned to this user.

The NFC chip that is embedded in a device, for example in a traditional rubber stamp, in a credit card, in a substrate attachable to objects and the like adaptations, would first be authenticated for first time use using a mobile application download to the mobile device with NFC capabilities or a computer that has a NFC reader. The purpose of this application is to pair the unique id stored in the NFC chip with the company id keyed in by the user on the application.

It is preferred that initiation of authentication is facilitated and controlled by the mobile application residing on the mobile communication device with the mobile application managing the first time use registration and authentication, initiation of the authentication process via proximal interaction/signal communication of the NFC chip with the mobile communication device, initiation of the authentication process via the mobile application and/or via an authenticated mobile application (preferably residing on another mobile communication device) and managing download and decryption of the image, for example a company stamp image, to be stored in the library residing on the mobile communication device or to be applied to an electronic document residing on or being accessed by the mobile communication device.

It is preferred that the mobile application and the mobile communication device constitute at least a portion of the authentication system. Further, the authentication system can further comprise the cloud based platform with which the mobile application communicates and interacts with via the mobile communication device.

The admin user would be able to assign different users to have the rights to use this particular stamp to authenticate and verify documents with their unique pin.

Whenever the stamp is used by touching a NFC enabled mobile communication device that is embedded with the software library provided to them by us, a second factor authentication prompt will be triggered by the library which will communicate with our platform in the cloud, whereby they would be required to enter their pin to verify themselves as an authorized user. This pin will be sent together with the authentication id and company id for verification by the cloud-based platform.

Once authenticated, the digital image of the company stamp would be sent to the library to be superimposed onto, tagged with or merged with the document together with an optional signatory process (i.e. wet ink signature or electronic image signature).

This signed document will be stored back into the cloud for archival and retrieval by verified users.

Authenticated Mobile Application

Figure 4:
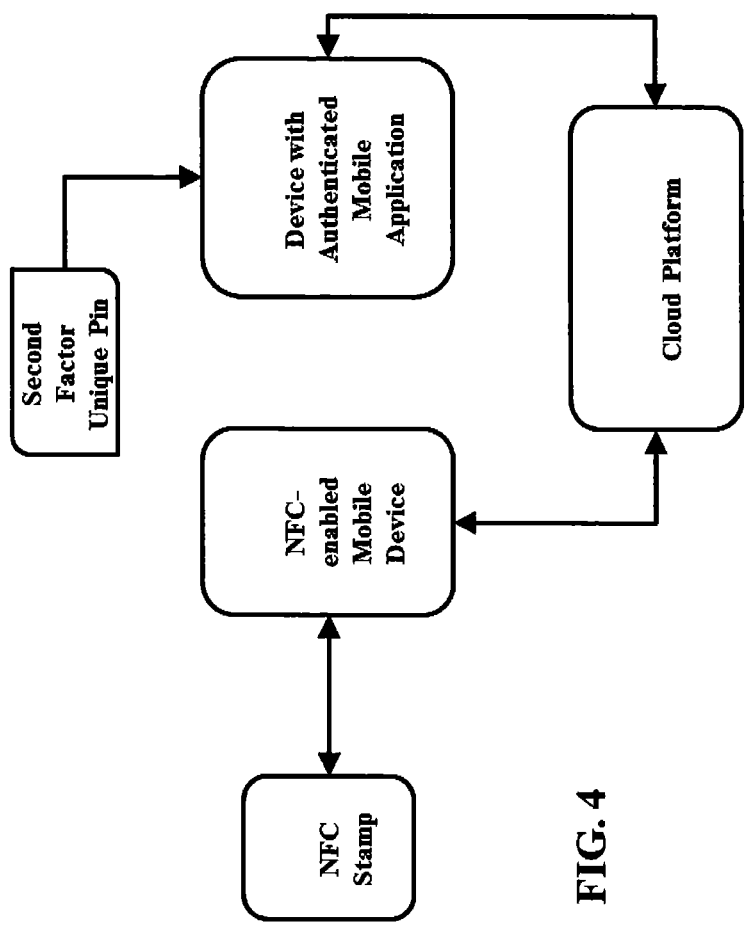
FIG. 4. Shows a system flow diagram of the other of the options of the authentication method/process of FIG. 2 that can be triggered by the authenticated mobile application.

An alternative authentication method exists as shown in FIG. 4. A user has to pair a mobile device to the cloud platform with the company id using the mobile authentication application.

Figure 2:
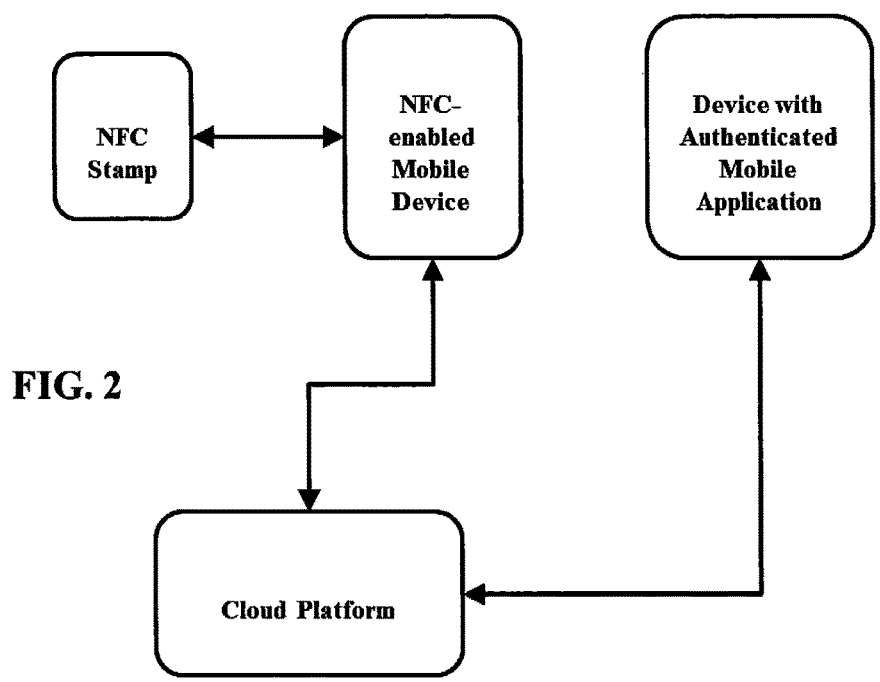
FIG. 2. shows a system flow diagram of the authentication system of FIG. 1 with option of two actions that can be triggered by the embedded library in the mobile application.

When a user selects the option of "Authentication through mobile application" as shown in FIG. 2 and FIG. 4, the user is prompted by the library to enter the company id into the mobile application.

A push notification will be triggered to the mobile authenticated device that is paired to the company id. This will result in an authentication process that is triggered by the system. A push notification will be sent to the mobile authenticated device. This will trigger a prompt by the application to request for an authentication pin by the user. Once the correct pin is entered into the system, the cloud platform will push the encrypted company image to the mobile application that is embedded by our library.

Encrypted Company Stamp

Figure 3:
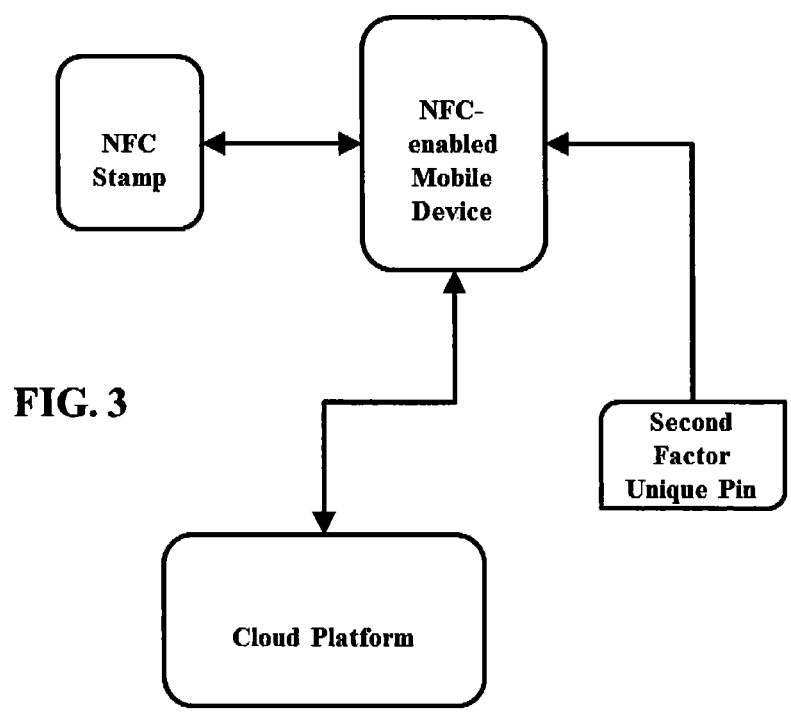
FIG. 3. shows a system slow diagram of one of the options of the authentication method/process of FIG. 2 that can be triggered by the NFC-Enabled Rubber Stamp.

When a user is successfully authenticated through FIG. 3 or FIG. 4, a digital company stamp will be created containing the company stamp image as well as encapsulated and embedded with the name of the user that authorized the one time use of the stamp as well as timestamp.

The recreated image will be encrypted and sent to the library through the internet from the cloud platform and sent to the software library on the mobile application. Once it reaches the software library, it will be decrypted and embedded in the mobile application or mobile form.

EXAMPLES

In an example of the application of the authentication system, specifically with use of the NFC chip, and the authentication method, a logistic truck driver carries a tablet containing a mobile application that is embedded with our software library. Here, the tablet functions as the mobile communication device as aforementioned.

When he reaches the customer's place, he will launch the application requesting for the customer's signature and company stamp.

There are two situations that can take place (or two options to be selectable):

Situation 1: (Customer Selects "Authenticate Through NFC Enabled Stamp" <See FIG. 3>

The customer will use the NFC enabled Stamp and touch the NFC enabled Tablet containing our mobile application that is embedded with our software library. This will trigger a process whereby the software library will request for the customer's pin. The company id, nfc unique id, customer's pin will be encrypted and sent to the cloud for authentication.

If the details are successfully authenticated, the company stamp image will be sent from the cloud embedded with the user name as well as timestamp to the software library to be superimposed onto the electronic document in the mobile application or the mobile form.

Situation 2: (Customer Selects "Authenticate Through Mobile Authenticated Device" <See FIG. 4>

A push notification will be sent to the mobile authenticated device that was paired to the company id. The customer can launch the app to approve the one time usage of the digital company stamp.

The application will prompt for a pin verification. Once the user is successfully authenticated, the cloud platform will push the encrypted image embedded with the user's name and timestamp details to the software library on the mobile application that triggered this process.

Aspects of particular embodiments of the present disclosure address at least one aspect, problem, limitation, and/or disadvantage associated with existing computer-implemented methods and systems. While features, aspects, and/or advantages associated with certain embodiments have been described in the disclosure, other embodiments may also exhibit such features, aspects, and/or advantages, and not all embodiments need necessarily exhibit such features, aspects, and/or advantages to fall within the scope of the disclosure. It will be appreciated by a person of ordinary skill in the art that several of the above-disclosed structures, components, or alternatives thereof, can be desirably combined into alternative structures, components, and/or applications. In addition, various modifications, alterations, and/or improvements may be made to various embodiments that are disclosed by a person of ordinary skill in the art within the scope of the present disclosure, which is limited only by the following claims.

The invention claimed is:

1. An authentication system for utilizing an embedded NFC chip couplable with an object for authenticating a document, the authentication system comprising
   a mobile communication device comprising a controller executing a mobile application to enable initiation of an authentication process via at least one of detecting proximity of the NFC chip with the mobile communication device and initiation by a user by interaction thereof with the mobile communications device, the authentication process for prompting for capturing a password code from the user identifying a user id, the user id being one of captured from one of the user and provided with the document, and receiving an NFC chip id from the NFC chip, the password code being capturable from the user when the user interacts with one of the mobile communication device and another mobile device in data communication with the mobile communication device, the password code and at least one of the NFC chip id and the user id being providable to a cloud platform for authentication thereby, wherein an image is receivable from the cloud platform upon positively authenticating that the user identified by the password code is one of the plurality of authorized users of the NFC chip and that least one of the NFC chip id is associated with the user id for one of application to or association with the document stored and processable by one of the mobile communication device and a system in data communication with the mobile communication device.

2. The authentication system as in claim 1, the object being one of a rubber stamp, a credit card and a substrate couplable to other objects.

* * * * *